United States Patent [19]

Ikeda et al.

[11] Patent Number: 5,409,756
[45] Date of Patent: Apr. 25, 1995

[54] OPTICAL DISC WITH CORROSION-RESISTANT METALLIC REFLECTIVE LAYER

[75] Inventors: Jiro Ikeda; Yoshitake Yanagisawa, both of Shizuoka, Japan

[73] Assignee: Sony Corporation, Tokly, Japan

[21] Appl. No.: 943,763

[22] Filed: Sep. 11, 1992

[30] Foreign Application Priority Data

Sep. 25, 1991 [JP] Japan .................. 3-246091

[51] Int. Cl.6 ............................. B32B 3/00
[52] U.S. Cl. ....................... 428/64; 428/65; 428/457; 428/913; 346/135.1; 430/945; 369/288; 347/264
[58] Field of Search ............... 428/64, 65, 457, 913; 346/76 L, 135.1; 430/945; 369/288

[56] References Cited

U.S. PATENT DOCUMENTS 4,956,216  9/1990  Hausler et al. .

FOREIGN PATENT DOCUMENTS

WO82/01098  4/1982  WIPO ............. G11B 7/00

OTHER PUBLICATIONS

Patent Abstracts of Japan, vol. 8, No. 45 (P-257), 28 Feb. 1984 & JP-A-58 196 641 (Sharp K.K.), 16 Nov. 1983.
Patent Abstracts of Japan, vol. 14, No. 98 (P-1011), 22 Feb. 1990 & JP-A-13 02 552 (Hitachi Maxell Ltd.).

*Primary Examiner*—Patrick J. Ryan
*Assistant Examiner*—Elizabeth Evans
*Attorney, Agent, or Firm*—Charles P. Sammut; Limbach & Limbach

[57] ABSTRACT

An optical disc for use as a compact disc, an optical video disc, or the like has a disc substrate of a light-transmissive material such as polycarbonate, PMMA, or the like. The disc substrate has a pattern of pits and lands formed as representing an information signal on at least one surface thereof. A thin reflective layer of a-corrosion-resistant metallic material such as an alloy of Fe, Ni, and Co is deposited on the disc substrate over the pattern of pits and lands. The optical disc is relatively inexpensive to manufacture as no protective layer needs to be deposited on the reflective layer and is also highly resistant to loss of performance with aging because the reflective layer is made of a corrosion-resistant metallic material.

4 Claims, 4 Drawing Sheets

OPTICAL DISC WITH CORROSION-RESISTANT METALLIC REFLECTIVE LAYER

BACKGROUND OF THE INVENTION

1. Field of the Invention

The present invention relates to an optical disc for storing various information signals such as musical tone signals, video signals, data signals, etc., which can optically be read out for reproduction.

2. Description of the Prior Art

FIG. 1 of the accompanying drawings shows one conventional read-only optical disc which stores various information signals such as musical tone signals, video signals, data signals, etc., which can optically be read out for reproduction. The optical disc, designated by the reference numeral 11, comprises a disc substrate 12 having a signal pattern 13 which has been formed as a pattern of pits and lands on one surface thereof according to an information signal, a thin reflective layer 14 deposited on the signal pattern 13, and a protective layer 15 deposited on the reflective layer 14 for protecting the same.

The disc substrate 12 is injection-molded of a light-transmissive synthetic resin such as polycarbonate, PMMA, or the like by an injection molding machine with a stamper which has a pattern of pits and lands based on the information signal to be recorded on the optical disc 11. Specifically, the light-transmissive synthetic resin is injected into a cavity in the injection molding machine, and the pattern of pits and lands on the stamper is transferred onto one surface of the cake of light-transmissive synthetic resin in the cavity, thereby forming the signal pattern 13 on the surface of the disc substrate 12.

According to another known optical disc fabrication process, a layer of ultraviolet-curing resin is coated on one surface of a flat glass substrate. Then, a stamper having a pattern of pits and lands according to an information signal to be recorded is pressed against the coated layer of ultraviolet-curing resin. While the stamper is being pressed against the coated layer of ultraviolet-curing resin, an ultraviolet radiation is applied to the layer of ultraviolet-curing resin through the glass substrate, thus curing the layer of ultraviolet-curing resin on the glass substrate. Thereafter, the stamper is detached from the cured layer of ultraviolet-curing resin. In this manner, the pattern of pits and lands on the stamper is replicated on the layer of ultraviolet-curing resin on the glass substrate, thus producing a disc substrate.

Generally, the former disc substrate injection-molded of light-transmissive synthetic resin is widely used because it is less costly to manufacture than the latter disc substrate with the layer of ultraviolet-curing resin.

The thin reflective layer 14 is deposited on the signal pattern 13 of the disc substrate 12 which may be fabricated according to either the former or the latter fabrication process. The reflective layer 14 may be made of Al, Au, or the like, but is most commonly made of Al due to its lower cost. Using an evaporation source of Al, the thin reflective layer 14 is formed by evaporation or sputtering over the signal pattern 13 on one surface of the disc substrate 12.

Subsequently, the protective layer 15 is deposited on the reflective layer 14 to protect the same. The protective layer 15 is made of ultraviolet-curing resin. Specifically, the ultraviolet-curing resin is dropped in an annular pattern on a radially inner region of the reflective layer 14 on the protective layer 15, and then the disc substrate 15 is rotated at high speed by a rotary actuator to cause the dropped ultraviolet-curing resin to spread radially outwardly as a thin layer under centrifugal forces. The radially outwardly spread thin layer serves as the protective layer 15.

The read-only optical disc, typically a compact disc, an optical video disc, or the like, is manufactured in the manner described above.

One problem with the conventional optical disc 11 is as follows: Due to aging of the optical disc 11, air tends to find its way into the optical disc from between the disc substrate 12 and the protective layer 15, and to oxidize the aluminum of the reflective layer 14 when held in contact therewith. When the aluminum of the reflective layer 14 is oxidized, it turns to aluminum oxide which is transparent, and the reflective layer 14 can no longer perform its function.

In addition, since the reflective layer 14 of metallic material and the protective layer 15 of ultraviolet-curing resin do not adhere to each other with high bonding strength, the protective layer 15 is liable to peel easily from the reflective layer 14.

OBJECTS AND SUMMARY OF THE INVENTION

In view of the aforesaid drawbacks of the conventional optical discs, it is an object of the present invention to provide an optical disc which is relatively inexpensive to manufacture and highly resistant to loss of performance with aging.

According to the present invention, there is provided an optical disc comprising a disc substrate of a light-transmissive material and having a pattern of pits and lands formed as representing an information signal on at least one surface thereof, and a thin reflective layer of a corrosion-resistant metallic material deposited on the pattern of pits and lands of the disc substrate. The corrosion-resistant metallic material may comprise an alloy of Fe, Ni, and Co, or a stainless steel material.

Two of the above optical discs may be bonded to each other by an adhesive layer coated on the reflective layers of the optical discs.

According to the present invention, there is also provided an optical disc comprising a disc substrate of a light-transmissive material and having a pattern of pits and lands formed as representing an information signal on at least one surface thereof, and a thin reflective layer of a metallic material deposited on the pattern of pits and lands of the disc substrate such that the thin reflective layer has a reflectance ranging from 20 to 50% with respect to a light beam having a wavelength ranging from 380 to 820 nm which is applied from a light source to the optical disc for reading the information signal from the optical disc. The metallic material may comprise a corrosion-resistant metallic material. The reflective layer has a thickness of 1000 Å or less.

The optical disc is relatively inexpensive to manufacture as no protective layer is deposited on the reflective layer, and is also highly resistant to aging because the reflective layer is made of a corrosion-resistant metallic material.

The above and other objects, features, and advantages of the present invention will become apparent from the following description of illustrative embodiments thereof to be read in conjunction with the accompanying drawings, in which like reference numerals represent the same or similar objects.

DETAILED DESCRIPTION OF THE PREFERRED EMBODIMENTS

Figure 1:
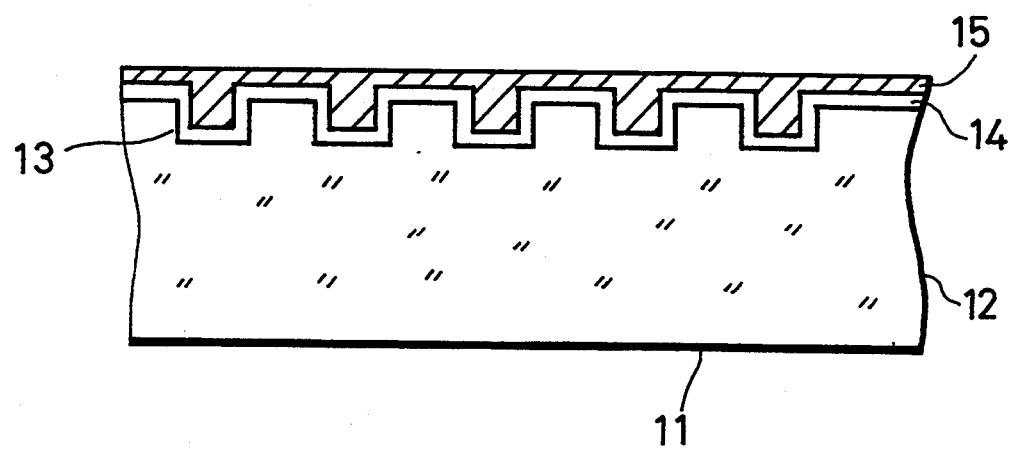
FIG. 1 is a fragmentary cross-sectional view of a conventional optical disc.
Figure 2:
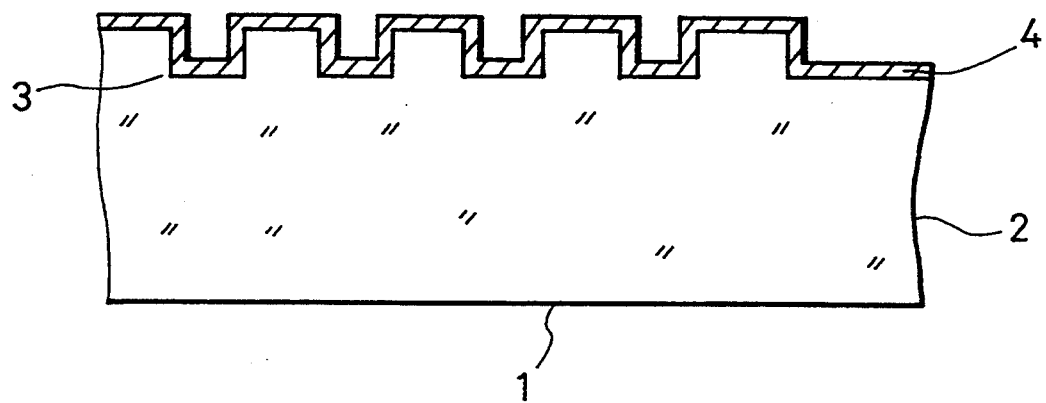
FIG. 2 is a fragmentary cross-sectional view of an optical disc according to a first embodiment of the present invention.

FIG. 2 (not to scale) fragmentarily shows a read-only optical disc 1 according to a first embodiment of the present invention. The optical disc 1 has a diameter of 64 mm and a thickness of 1.3 mm, for example, and serves to store, on one surface thereof, various information signals such as musical tone signals, video signals, data signals, etc., which can optically be read out for reproduction. The optical disc 1 comprises a disc substrate 2 having a signal pattern 3 which has been formed as a pattern of pits and lands on one surface thereof according to an information signal. The disc substrate 2 is injection-molded of a light-transmissive synthetic resin such as polycarbonate, PMMA, or the like by an injection molding machine with a stamper which has a pattern of pits and lands complementary to the signal pattern 3 of pits and lands. The optical disc 1 also has a thin reflective layer 4 deposited on the signal pattern 3 up to a thickness of 1000 Å or less by way of sputtering, evaporation, or the like. The reflective layer 4 is made of a corrosion-resistant stainless steel material. In general, stainless steel is an alloy comprising Fe and Cr. Two exemplary stainless steel alloys are Fe—Cr—Ni—Co and Fe—Cr—Ni—S—P—Mn—Si—C. The reflective layer 4 is formed so as to cover at least an entire signal recording area of the disc substrate 2 where the signal pattern 3 is formed.

The reflective layer 4 may alternatively be made of a corrosion-resistant metallic material such as a Hastelloy (tradename) alloy of Ni, Cr, and Mo, or a Haynes alloy of Co, Ni, and Cr, or a metal such as Ti (titanium) or the like.

After the reflective layer 4 has been deposited on the disc substrate 2, the optical disc 1 may be printed with identification and description data, known as a label, regarding the recorded information signal by the silk screen printing, as with usual compact discs and optical video discs.

As shown in FIG. 2, the reflective layer 4 on the signal pattern 3 of the disc substrate 2 is so thin that it also has a pattern of pits and lands on its outer surface. The reflective layer 4 with such pattern of pits and lands has a relatively low reflectance.

Figure 3:
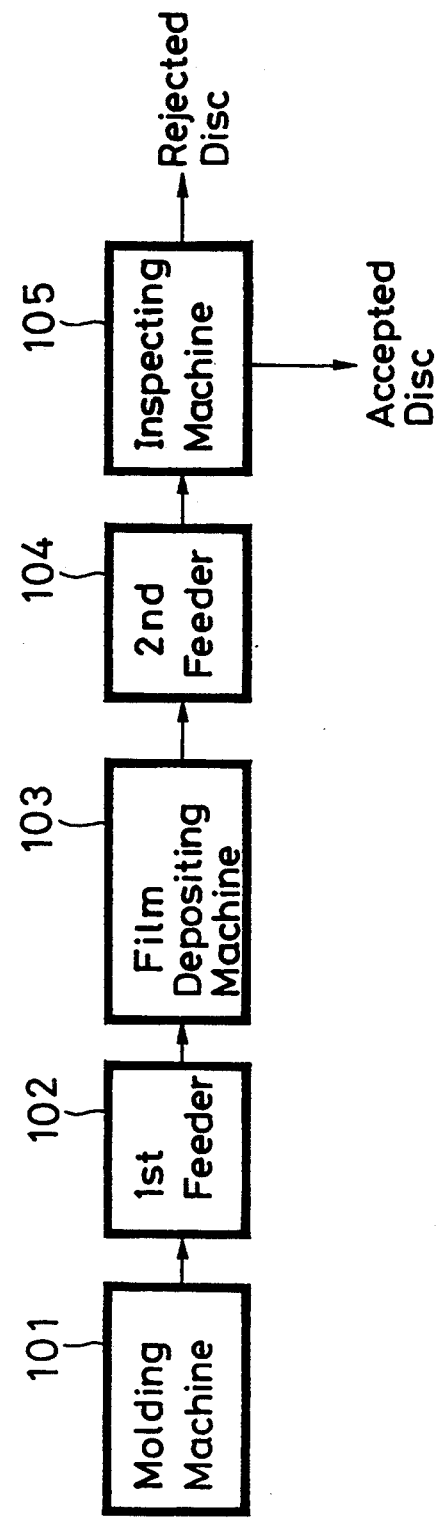
FIG. 3 is a block diagram of an apparatus for manufacturing the optical disc according to the present invention.

FIG. 3 shows in block form an apparatus for manufacturing the optical disc according to the present invention. The apparatus has a molding machine 101 which molds a disc substrate of a light-transmissive synthetic resin, with a pattern of pits and lands transferred from a stamper to one surface of the disc substrate. The disc substrate molded by the molding machine 101 is then fed by a first feeder 102 to a layer depositing machine 103 which comprises a sputtering machine. In the sputtering machine, the disc substrate is placed in a layer depositing chamber in the form of a vacuum container, and a thin reflective layer is deposited on the disc substrate by a sputtering source in an argon gas atmosphere. The sputtering source comprises a target of a stainless steel material positioned in confronting relationship to the disc substrate that is placed in the layer depositing chamber. While DC sputtering electric power is being supplied between the target and the disc substrate, the stainless steel material from the target is deposited on the disc substrate by way of sputtering in the argon gas.

The DC sputtering electric power supplied between the target and the disc substrate, is controlled to deposit the reflective layer up to a predetermined thickness on the disc substrate, i.e., to cause the reflective layer to have a reflectance ranging from 20 to 50% with respect to the wavelength ranging from 380 to 820 nm of a light beam which will be applied from a light source to the optical disc for reading the recorded information signal from the optical disc.

The optical disc with the reflective layer thus deposited on the disc substrate is thereafter fed by a second feeder 104 to an inspecting machine 105 which inspects the reflective layer deposited on the disc substrate. The inspecting machine 105 determines the inspected optical disc as either an accepted optical disc or a rejected optical disc.

An optical disc according to an embodiment of the present invention (hereinafter called the inventive example) and an optical disc manufactured by the conventional process (hereinafter called the comparative example) will be compared below.

According to the inventive example, a disc substrate was injection-molded of polycarbonate by an injection molding machine, with a pattern of pits and lands transferred from a stamper to one surface of the disc substrate. Thereafter, a reflective layer of stainless steel material (SUS304) was deposited on the pattern of pits and lands under a pressure of $5 \times 10^{-3}$ Torr by a sputtering device. No protective layer was deposited on the reflective layer.

According to the comparative example, a reflective layer of Al was deposited on a disc substrate of polycarbonate, and thereafter coated with a photo-setting acrylic protective coating layer by the spin coating process. The coated photo-setting acrylic protective coating layer was then set by exposure to an ultraviolet radiation, thereby producing a protective layer on the reflective layer.

The following table shows the corrosion resistance of the inventive and comparative examples.

|  | Immersed for 12 hours in tap water boiled to 100° C. | Immersed for 12 hours in 10% saline solution boiled to 100° C. | Placed for 40 days in thermostatic chamber at temperature of 60° C. and humidity of 90% |
| --- | --- | --- | --- |
| Inventive example | No change | No change | No change |
| Comparative example | Al was oxidized and became transparent | Al was oxidized and became transparent | Al was partly oxidized and became turbid |

The optical disc according to the inventive example was tested for reflective layer adhesion. An adhesive Cellophane Tape (trademark) or a gummed tape was applied to the reflective layer of the optical disc, and then peeled off. The reflective layer was not peeled. The same test was conducted on the optical disc according to the comparative example, and the reflective layer was peeled.

The reflectance of the reflective layer of the optical disc according to the inventive example remained unchanged after it was immersed in tap water or saline solution boiled to 100° C.

For compatibility with magnetooptical discs which comprise a thin layer of magnetooptical recording material coated on a light-transmissive disc substrate, since the reflective layers of presently available magnetooptical discs have a reflectance ranging from 15 to 30%, the reflective layer of the optical disc according to the present invention is deposited by the above manufacturing device such that its reflectance ranges from 20 to 35% in order to compensate for a reflectance loss of about 5% which is caused by the disc substrate. Since the reflective layer of the read-only optical disc according to the present invention has substantially the same reflectance as that of the magnetooptical discs, they can be played back by a common reproducing circuit with a constant servo gain without suffering various problems such as the need for switching between reproducing or recording circuits due to different reflectances and the need for switching between gains for a servo control circuit associated with an optical pickup, which problems would otherwise arise out of the difference between the reflectance of 80% or more of optical discs with reflective layers of Al and the reflectance of about 40% of magnetooptical discs.

Figure 4:
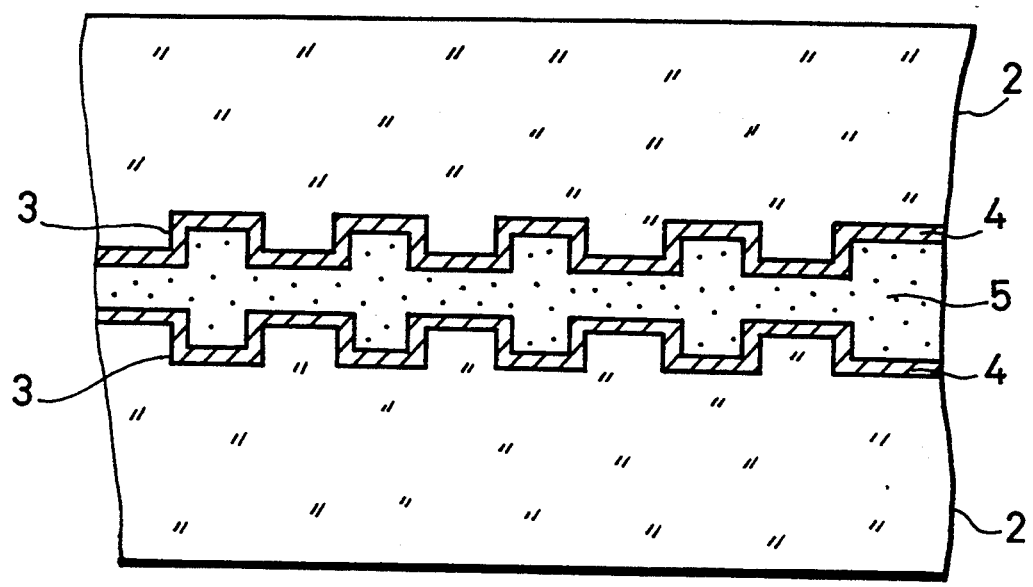
FIG. 4 is a fragmentary cross-sectional view of an optical disc according to a second embodiment of the present invention.

FIG. 4 fragmentarily shows an optical disc according to a second embodiment of the present invention. The optical disc according to the second embodiment comprises two read-only optical discs 1 according to the first embodiment which are bonded to each other by an adhesive layer 5 coated on the reflective layers 4 of the optical discs 1. If two conventional optical discs with protective layers were bonded to each other by an adhesive layer coated on the protective layers, then the peelability of the resultant optical disc would be governed by the bonding strength between the protective and reflective layers and also between the protective layers and the adhesive layer. According to the second embodiment shown in FIG. 4, however, since only the bonding strength between the reflective layers 4 and the adhesive layer 5 determines the peelability of the optical disc, this second embodiment, shown in FIG. 4, is less liable to peel than an optical disc composed of two conventional optical discs bonded to each other.

As described above, the read-only optical disc according to the present invention comprises a disc substrate of light-transmissive synthetic resin with a pattern of pits and lands formed on one surface thereof based on a recorded information signal, and a reflective layer of a corrosion-resistant metallic material deposited on the pattern of pits and lands of the disc substrate. However, the read-only optical disc may be composed of a glass substrate having a flat surface which is fabricated as follows: The flat surface of the glass substrate is coated with a layer of ultraviolet-curing resin. Then, a stamper having a pattern of pits and lands according to an information signal to be recorded is pressed against the coated layer of ultraviolet-curing resin. While the stamper is being pressed against the coated layer of ultraviolet-curing resin, an ultraviolet radiation is applied to the layer of ultraviolet-curing resin through the glass substrate, thus curing the layer of ultraviolet-curing resin on the glass substrate. Thereafter, the stamper is detached from the cured layer of ultraviolet-curing resin.

The reflective layer of the optical disc according to the present invention does not need to be protected as it is made of a corrosion-resistant metallic material. Particularly, in the case where the optical disc is stored in a disc cartridge, since the optical disc is protected as a whole by the disc cartridge, no protective layer for protecting the reflective layer is required at all. If the optical disc is not stored in a disc cartridge, however, the reflective layer may be protected by a protective layer because the thin metallic reflective layer deposited on the disc substrate may possibly be peeled off when it comes into contact with a sharp pointed object.

In the above embodiments, the reflective layer is formed so as to cover at least the entire signal recording area of the disc substrate. However, the reflective layer may be formed so as to cover either the entire surface of the disc substrate where the signal pattern is formed or the surface of the disc substrate where the signal pattern is formed except for a disc region that will be gripped by a disc rotating unit of a recording or reproducing device for the optical disc.

The reflective layer of a corrosion-resistant metallic material such as a stainless steel material, which is deposited on the pattern of pits and lands of the transparent disc substrate, is effective to reduce the cost of the optical disc, and also to reduce loss of performance with aging of the optical disc.

Having described preferred embodiments of the invention with reference to the accompanying drawings, it is to be understood that the invention is not limited to that precise embodiments and that various changes and modifications could be effected by one skilled in the art without departing from the spirit or scope of the invention as defined in the appended claims.

What is claimed is:

1. An optical disc comprising:
   a disc substrate of a light-transmissive material and having a pattern of pits and lands formed as representing an information signal on at least one surface thereof; and
   a thin reflective layer, comprising a corrosion-resistant metallic material which consists of an alloy of Fe, Ni, and Co, deposited on said pattern of pits and lands of said disc substrate.

2. An optical disc comprising:
   a disc substrate of a light-transmissive material and having a pattern of pits and lands formed as representing an information signal on at least one surface thereof; and
   a thin reflective layer, comprising a corrosion-resistant metallic material which consists of a stainless steel material, deposited on said pattern of pits and lands of said disc substrate.

3. An optical disc comprising:
   a first optical disc member comprising a first disc substrate of a light-transmissive material and having a pattern of pits and lands formed as representing an information signal on at least one surface thereof, and a first thin reflective layer of a corrosion-resistant metallic material deposited on said pattern of pits and lands of said first disc substrate;

a second optical disc member comprising a second disc substrate of a light-transmissive material and having a pattern of pits and lands formed as representing an information signal on at least one surface thereof, and a second thin reflective layer of a corrosion-resistant metallic material deposited on said pattern of pits and lands of said second disc substrate;

an intermediate layer of an adhesive bonding said first and second reflective layers to each other; and with said corrosion-resistant metallic material of each of said first and second thin reflective layers consisting of an alloy of Fe, Ni, and Co.

4. An optical disc comprising:

a first optical disc member comprising a first disc substrate of a light-transmissive material and having a pattern of pits and lands formed as representing an information signal on at least one surface thereof, and a first thin reflective layer of a corrosion-resistant metallic material deposited on said pattern of pits and lands of said first disc substrate;

a second optical disc member comprising a second disc substrate of a light-transmissive material and having a pattern of pits and lands formed as representing an information signal on at least one surface thereof, and a second thin reflective layer of a corrosion-resistant metallic material deposited on said pattern of pits and lands of said second disc substrate;

an intermediate layer of an adhesive bonding said first and second reflective layers to each other; and with said corrosion-resistant metallic material of each of said first and second thin reflective layers consisting of a stainless steel material.

* * * * *